United States Patent
Chen (10) Patent No.: US 10,348,559 B2
(45) Date of Patent: Jul. 9, 2019

(54) METHOD FOR CREATING PORT GROUP ON SDN, SDN CONTROLLER, AND NETWORK SYSTEM

(71) Applicant: Huawei Technologies Co., Ltd., Shenzhen (CN)

(72) Inventor: Zhifeng Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 15/599,002

(22) Filed: May 18, 2017

(65) Prior Publication Data

US 2017/0257271 A1  Sep. 7, 2017

Related U.S. Application Data

(63) Continuation of application No. PCT/CN2015/083578, filed on Jul. 8, 2015.

(30) Foreign Application Priority Data

Dec. 31, 2014  (CN) .......................... 2014 1 0849316

(51) Int. Cl.
*H04L 12/24* (2006.01)
*H04L 12/709* (2013.01)
(Continued)

(52) U.S. Cl.
CPC ...... *H04L 41/0816* (2013.01); *H04L 41/0803* (2013.01); *H04L 41/0893* (2013.01);
(Continued)

(58) Field of Classification Search
CPC ... H04L 41/0816; H04L 45/245; H04L 45/38; H04L 41/0893; H04L 41/0803;
(Continued)

(56) References Cited

U.S. PATENT DOCUMENTS

2006/0246900 A1  11/2006  Zheng
2013/0329601 A1*  12/2013  Yin .................. H04L 45/02
370/254

(Continued)

FOREIGN PATENT DOCUMENTS

CN  1747432 A  3/2006
CN  1860458 A  11/2006
(Continued)

OTHER PUBLICATIONS

"OpenFlow Switch Specification," Version 1.1.0 Implemented (Wire Protocol 0x02) ONF TS-002, Feb. 28, 2011, 58 pages.
(Continued)

*Primary Examiner* — Will W Lin
(74) *Attorney, Agent, or Firm* — Conley Rose, P.C.

(57) ABSTRACT

A method for creating a port group, includes generating, by a first software defined network (SDN) controller, the specified identifier according to a device identifier of a first forwarding device in a preset path, a device identifier of a last forwarding device in the preset path, and a device identifier of a specified forwarding device in the preset path; and sending, by the first SDN controller, the specified identifier to a second SDN controller, so that the second SDN controller creates, on the specified forwarding device, a specified port group corresponding to the specified identifier. Therefore, the first SDN controller needs to interact with the second SDN controller only once, to create a port group on the specified forwarding device that is directly controlled by the second SDN controller, and thus the port group creation process is simple.

13 Claims, 5 Drawing Sheets

---

A first SDN controller generates a specified identifier according to a device identifier of a first forwarding device in a preset path, a device identifier of a last forwarding device in the preset path, and a device identifier of a specified forwarding device in the preset path  — 101

The first SDN controller creates, on a second SDN controller, a specified port group corresponding to the specified identifier and enables the second SDN controller to deliver the specified port group to the specified forwarding device  — 102

(51) Int. Cl.
  *H04L 12/715* (2013.01)
  *H04L 12/937* (2013.01)
  *H04L 12/721* (2013.01)
  *G06F 16/13* (2019.01)
  *G06F 16/11* (2019.01)
  *G06F 16/23* (2019.01)
  *G06F 9/455* (2018.01)
  *H04L 29/08* (2006.01)

(52) U.S. Cl.
  CPC ............ *H04L 45/245* (2013.01); *H04L 45/38* (2013.01); *H04L 45/46* (2013.01); *H04L 45/64* (2013.01); *H04L 49/253* (2013.01); *G06F 9/45558* (2013.01); *G06F 16/128* (2019.01); *G06F 16/13* (2019.01); *G06F 16/2379* (2019.01); *H04L 67/303* (2013.01)

(58) Field of Classification Search
  CPC ....... H04L 45/64; H04L 49/253; H04L 45/46; H04L 67/303; G06F 16/128; G06F 16/13; G06F 16/2379; G06F 9/45558
  See application file for complete search history.

(56) References Cited

U.S. PATENT DOCUMENTS

| | | | |
|---|---|---|---|
| 2014/0211661 A1 | 7/2014 | Gorkemli et al. | |
| 2014/0325038 A1* | 10/2014 | Kis | H04L 41/0803 709/220 |
| 2014/0355448 A1 | 12/2014 | Kawano | |
| 2015/0071111 A1* | 3/2015 | Tao | H04L 45/02 370/254 |
| 2015/0124812 A1* | 5/2015 | Agarwal | H04L 45/24 370/392 |
| 2015/0281036 A1* | 10/2015 | Sun | H04L 43/0829 370/248 |
| 2015/0281067 A1* | 10/2015 | Wu | H04L 61/103 370/392 |
| 2015/0312142 A1* | 10/2015 | Barabash | H04L 45/42 370/400 |
| 2015/0365193 A1* | 12/2015 | Connolly | H04L 41/0803 398/52 |
| 2015/0372905 A1* | 12/2015 | Hu | H04L 67/104 370/389 |
| 2015/0381493 A1* | 12/2015 | Bansal | H04L 45/30 370/392 |
| 2016/0156550 A1* | 6/2016 | Song | H04L 12/44 370/256 |
| 2016/0197824 A1* | 7/2016 | Lin | H04L 12/6418 370/389 |
| 2016/0315845 A1* | 10/2016 | Yu | H04L 45/02 |

FOREIGN PATENT DOCUMENTS

| | | |
|---|---|---|
| CN | 103051539 A | 4/2013 |
| CN | 103117925 A | 5/2013 |
| CN | 103782553 A | 5/2014 |
| CN | 103944828 A | 7/2014 |
| EP | 3029905 A1 | 6/2016 |

OTHER PUBLICATIONS

"OpenFlow Switch Specification," Version 1.4.0 (Wire Protocol 0x05) ONF TS-012, Oct. 14, 2013, 206 pages.
Foreign Communication From a Counterpart Application, PCT Application No. PCT/CN2015/083578, English Translation of International Search Report dated Sep. 24, 2015, 2 pages.
Foreign Communication From a Counterpart Application, PCT Application No. PCT/CN2015/083578, English Translation of Written Opinion dated Sep. 24, 2015, 4 pages.
Machine Translation and Abstract of Chinese Publication No. CN1747432, Mar. 15, 2006, 10 pages.
Foreign Communication From a Counterpart Application, Chinese Application No. 201410849316.8, Chinese Office Action dated May 15, 2018, 7 pages.
"OpenFlow Switch Specification," XP055111238, Version 1.3.1, Sep. 6, 2012, 128 pages.
Wolfgang, J., et al., "Update on Split Architecture for Large Scale Wide Area Networks," XP055070646, SPARC ICT-258457 Deliverable D3.2 Version 1.0, Dec. 31, 2011, 94 pages.
Foreign Communication From a Counterpart Application, European Application No. 15874817.8, Extended European Search Report dated Nov. 7, 2017, 12 pages.

* cited by examiner

METHOD FOR CREATING PORT GROUP ON SDN, SDN CONTROLLER, AND NETWORK SYSTEM

CROSS-REFERENCE TO RELATED APPLICATIONS

This application is a continuation of International Patent Application No. PCT/CN2015/083578, filed on Jul. 8, 2015, which claims priority to Chinese Patent Application No. 201410849316.8, filed on Dec. 31, 2014. The disclosures of the aforementioned applications are hereby incorporated by reference in their entireties.

TECHNICAL FIELD

The present disclosure relates to the communications field, and in particular, to a method for creating a port group on a software defined network (SDN), an SDN controller, and a network system.

BACKGROUND

An SDN is a network including an SDN controller and a forwarding device, and the forwarding device is connected to the SDN using the SDN controller. On the SDN, a forwarding plane is separated from a control plane. The forwarding device is connected to the SDN using the SDN controller and is configured to complete data forwarding. The SDN controller controls a forwarding process, a forwarding rule, and the like of the forwarding device that is connected to the SDN, and the forwarding device completes data forwarding. Another SDN controller may also control, using the SDN controller, the forwarding device that is connected to the SDN using the SDN controller. When there are multiple SDN controllers on the SDN, each SDN controller may directly control a forwarding device that is connected to the SDN using the SDN controller itself, and indirectly control, using another SDN controller, a forwarding device that is connected to the SDN using the another SDN controller.

When there are many forwarding devices on the SDN, the SDN controller establishes in advance a preset path between different forwarding devices according to a connection relationship between the forwarding devices. If there are multiple SDN controllers on the SDN, each SDN controller is responsible for creating a preset path between a forwarding device directly controlled by the SDN controller and another forwarding device. In addition to first and last forwarding devices located in endpoint positions of each preset path, each preset path may further include an intermediate forwarding device connected between the first and last forwarding devices. Different forwarding devices in a same preset path may be directly controlled by different SDN controllers.

To enable a same forwarding device to implement multiplexing in different preset paths, when establishing a preset path, an SDN controller generally needs to create a port group on the forwarding device, and use the port group to establish the preset path. A port group identifier is the only index for an SDN controller to perform an operation on a port group, and a port group identifier of a forwarding device is allocated by an SDN controller that directly controls the forwarding device. Therefore, when an SDN controller that does not directly control a forwarding device creates a port group on the forwarding device, the SDN controller needs to first acquire a port group identifier allocated to the forwarding device by an SDN controller that directly controls the forwarding device, and then sends a port group create instruction containing the port group identifier to the SDN controller that directly controls the forwarding device, so that the SDN controller that directly controls the forwarding device creates the port group on the forwarding device.

Therefore, it can be seen that, if a port group is created using the prior art, an SDN controller that does not directly control a forwarding device needs to interact, in a process of creating the port group on the forwarding device, with an SDN controller that directly controls the forwarding device for many times, and the creation process is complex.

SUMMARY

Embodiments of the present disclosure provide a method for creating a port group on an SDN, an SDN controller, and a network system, so as to solve a problem that multiple interactions need to be performed between different SDN controllers when a port group is created using the prior art, and a port group creation process is complex.

According to a first aspect, an embodiment of the present disclosure provides a method for creating a port group on a specified forwarding device on an SDN, where the method includes generating, by a first SDN controller, the specified identifier according to a device identifier of a first forwarding device in a preset path, a device identifier of a last forwarding device in the preset path, and a device identifier of the specified forwarding device in the preset path; and creating, by the first SDN controller on a second SDN controller, a specified port group corresponding to the specified identifier, and enabling the second SDN controller to deliver the specified port group to the specified forwarding device.

With reference to the first aspect, in a first possible implementation manner of the first aspect, the generating, by a first SDN controller, the specified identifier according to a device identifier of a first forwarding device in a preset path, a device identifier of a last forwarding device in the preset path, and a device identifier of the specified forwarding device in the preset path includes generating, by the first SDN controller, a specified identifier formed by combining, according to a predetermined sequence, the device identifier of the first forwarding device in the preset path, the device identifier of the last forwarding device in the preset path, and the device identifier of the specified forwarding device in the preset path.

With reference to the first aspect or the first possible implementation manner of the first aspect, in a second possible implementation manner of the first aspect, the creating, by the first SDN controller on a second SDN controller, a specified port group corresponding to the specified identifier, and enabling the second SDN controller to deliver the specified port group to the specified forwarding device includes creating, by the first SDN controller on the second SDN controller, a specified port group whose port group identifier is the specified identifier, and enabling the second SDN controller to deliver the specified port group whose port group identifier is the specified identifier to the specified forwarding device.

With reference to the first aspect or the first possible implementation manner of the first aspect, in a third possible implementation manner of the first aspect, the creating, by the first SDN controller on a second SDN controller, a specified port group corresponding to the specified identifier, and enabling the second SDN controller to deliver the specified port group to the specified forwarding device includes creating, by the first SDN controller on the second SDN controller, a specified port group whose port group identifier is a local identifier of the second SDN controller, and enabling the second SDN controller to deliver the specified port group whose port group identifier is the local identifier of the second SDN controller to the specified forwarding device, where the local identifier of the second SDN controller uniquely corresponds to the specified identifier.

According to a second aspect, an embodiment of the present disclosure provides a method for creating a port group on a specified forwarding device on an SDN, where the method includes receiving, by a second SDN controller, a specified identifier sent by a first SDN controller, where the specified identifier is generated by the first SDN controller according to a device identifier of a first forwarding device in a preset path, a device identifier of a last forwarding device in the preset path, and a device identifier of the specified forwarding device in the preset path; and creating, by the second SDN controller, a specified port group corresponding to the specified identifier, and delivering the specified port group to the specified forwarding device.

With reference to the second aspect, in a first possible implementation manner of the second aspect, the creating, by the second SDN controller, a specified port group corresponding to the specified identifier, and delivering the specified port group to the specified forwarding device includes creating, by the second SDN controller, a specified port group whose port group identifier is the specified identifier; and delivering, by the second SDN controller, the specified port group whose port group identifier is the specified identifier to the specified forwarding device.

With reference to the second aspect, in a second possible implementation manner of the second aspect, the creating, by the second SDN controller, a specified port group corresponding to the specified identifier, and delivering the specified port group to the specified forwarding device includes converting, by the second SDN controller, the specified identifier into a first local identifier; creating, by the second SDN controller, a specified port group whose port group identifier is the first local identifier; and delivering, by the second SDN controller, the specified port group whose port group identifier is the first local identifier to the specified forwarding device.

With reference to the second aspect, in a third possible implementation manner of the second aspect, the creating, by the second SDN controller, a specified port group corresponding to the specified identifier, and delivering the specified port group to the specified forwarding device includes acquiring, by the second SDN controller, a second local identifier; establishing, by the second SDN controller, a correspondence between the second local identifier and the specified identifier; creating, by the second SDN controller, a specified port group whose port group identifier is the second local identifier; and delivering, by the second SDN controller, the specified port group whose port group identifier is the second local identifier to the specified forwarding device.

With reference to any one of the second aspect and the first to third possible implementation manners of the second aspect, in a fourth possible implementation manner of the second aspect, before the delivering, by the second SDN controller, the specified port group to the specified forwarding device, the method further includes acquiring, by the second SDN controller, the device identifier of the specified forwarding device from the specified identifier; and determining, by the second SDN controller, the specified forwarding device according to the device identifier of the specified forwarding device.

According to a third aspect, an embodiment of the present disclosure provides an SDN controller, where the SDN controller includes a generation unit configured to generate the specified identifier according to a device identifier of a first forwarding device in a preset path, a device identifier of a last forwarding device in the preset path, and a device identifier of a specified forwarding device in the preset path; and a creation unit configured to create, on a specified SDN controller, a specified port group corresponding to the specified identifier, and enable the specified SDN controller to deliver the specified port group to the specified forwarding device.

With reference to the third aspect, in a first possible implementation manner of the third aspect, the generation unit is configured to generate a specified identifier formed by combining, according to a predetermined sequence, the device identifier of the first forwarding device in the preset path, the device identifier of the last forwarding device in the preset path, and the device identifier of the specified forwarding device in the preset path.

With reference to the third aspect or the first possible implementation manner of the third aspect, in a second possible implementation manner of the third aspect, the creation unit is configured to create, on the specified SDN controller, a specified port group whose port group identifier is the specified identifier, and enable the specified SDN controller to deliver the specified port group whose port group identifier is the specified identifier to the specified forwarding device.

With reference to the third aspect or the first possible implementation manner of the third aspect, in a third possible implementation manner of the third aspect, the creation unit is configured to create, on the specified SDN controller, a specified port group whose port group identifier is a local identifier of the specified SDN controller, and enable the specified SDN controller to deliver the specified port group whose port group identifier is the local identifier of the specified SDN controller to the specified forwarding device, where the local identifier of the specified SDN controller uniquely corresponds to the specified identifier.

According to a fourth aspect, an embodiment of the present disclosure provides an SDN controller, where the SDN controller includes a receiving unit configured to receive a specified identifier sent by a specified SDN controller, where the specified identifier is generated by the specified SDN controller according to a device identifier of a first forwarding device in a preset path, a device identifier of a last forwarding device in the preset path, and a device identifier of a specified forwarding device in the preset path; and a creation unit configured to create a specified port group corresponding to the specified identifier, and deliver the specified port group to the specified forwarding device.

With reference to the fourth aspect, in a first possible implementation manner of the fourth aspect, the creation unit includes a first creation subunit configured to create a specified port group whose port group identifier is the specified identifier; and a first delivery subunit configured to deliver the specified port group whose port group identifier is the specified identifier to the specified forwarding device.

With reference to the fourth aspect, in a second possible implementation manner of the fourth aspect, the creation unit includes a conversion subunit configured to convert the specified identifier into a first local identifier; a second creation subunit configured to create a specified port group whose port group identifier is the first local identifier; and a second delivery subunit configured to deliver the specified port group whose port group identifier is the first local identifier to the specified forwarding device.

With reference to the fourth aspect, in a third possible implementation manner of the fourth aspect, the creation unit includes an acquiring subunit configured to acquire a second local identifier; an establishment subunit configured to establish a correspondence between the second local identifier and the specified identifier; a third creation subunit configured to create a specified port group whose port group identifier is the second local identifier; and a third delivery subunit configured to deliver the specified port group whose port group identifier is the second local identifier to the specified forwarding device.

With reference to any one of fourth aspect and the first to third possible implementation manners of the fourth aspect, in a fourth possible implementation manner of the fourth aspect, the SDN controller further includes an acquiring unit configured to acquire the device identifier of the specified forwarding device from the specified identifier; and a determining unit configured to determine the specified forwarding device according to the device identifier of the specified forwarding device.

According to a fifth aspect, an embodiment of the present disclosure provides a network system, where the network system includes a first SDN controller, a second SDN controller, and a specified forwarding device, and the specified forwarding device is directly controlled by the second SDN controller; the first SDN controller is configured to generate the specified identifier according to a device identifier of a first forwarding device in a preset path, a device identifier of a last forwarding device in the preset path, and a device identifier of the specified forwarding device in the preset path; and create, on the second SDN controller, a specified port group corresponding to the specified identifier, and enable the second SDN controller to deliver the specified port group to the specified forwarding device; and the second SDN controller is configured to receive the specified identifier sent by the first SDN controller, create the specified port group corresponding to the specified identifier, and deliver the specified port group to the specified forwarding device.

With reference to the fifth aspect, in a first possible implementation manner of the fifth aspect, the second SDN controller is configured to create a specified port group whose port group identifier is the specified identifier, and deliver the specified port group whose port group identifier is the specified identifier to the specified forwarding device.

With reference to the fifth aspect, in a second possible implementation manner of the fifth aspect, the second SDN controller is configured to convert the specified identifier into a first local identifier; create a specified port group whose port group identifier is the first local identifier; and deliver the specified port group whose port group identifier is the first local identifier to the specified forwarding device.

With reference to the fifth aspect, in a third possible implementation manner of the fifth aspect, the second SDN controller is configured to acquire a second local identifier; establish a correspondence between the second local identifier and the specified identifier; create a specified port group whose port group identifier is the second local identifier; and deliver the specified port group whose port group identifier is the second local identifier to the specified forwarding device.

In the embodiments of the present disclosure, a first SDN controller generates the specified identifier according to a device identifier of a first forwarding device in a preset path, a device identifier of a last forwarding device in the preset path, and a device identifier of a specified forwarding device in the preset path; the first SDN controller sends the specified identifier to a second SDN controller, so that the second SDN controller creates, on the specified forwarding device, a specified port group corresponding to the specified identifier. According to the embodiments, the first SDN controller needs to interact with the second SDN controller only once, to create a port group on the specified forwarding device that is directly controlled by the second SDN controller. A quantity of interactions between the SDN controllers in a port group creation process is small, and the port group creation process is simple.

BRIEF DESCRIPTION OF THE DRAWINGS

To describe the technical solutions in the embodiments of the present disclosure more clearly, the following briefly introduces the accompanying drawings required for describing the embodiments. A person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a specified forwarding device refers to a forwarding device on which an SDN controller attempts to create a port group or perform an operation associated with a port group; a first SDN controller refers to an SDN controller that does not directly control the specified forwarding device; a second SDN controller refers to an SDN controller that directly controls the specified forwarding device.

For example, in a process of creating a preset path, the first SDN controller may be an SDN controller that directly controls a first forwarding device; the specified forwarding device may be an intermediate forwarding device that is not directly controlled by the first SDN controller; the second SDN controller may be an SDN controller that directly controls the specified forwarding device.

Figure 1:
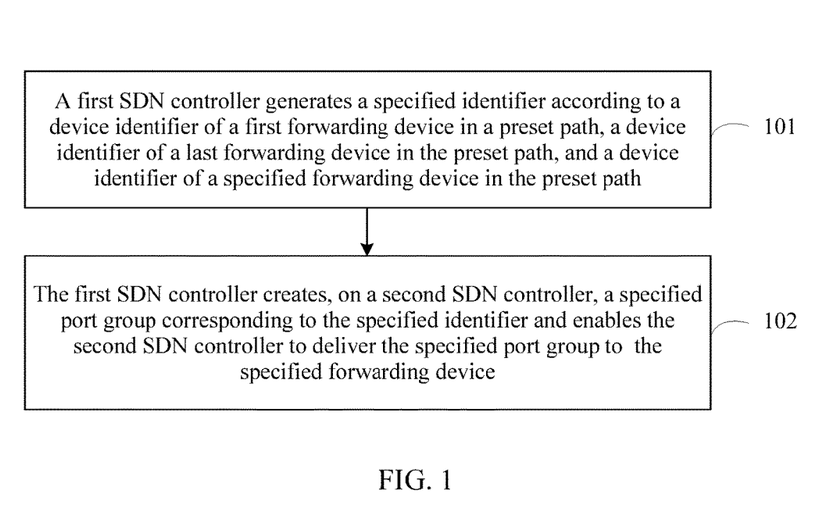
FIG. 1 is a flowchart of an embodiment of a method for creating a port group on a specified forwarding device on an SDN according to the present disclosure.

Referring to FIG. 1, FIG. 1 is a flowchart of an embodiment of a method for creating, by an SDN controller, a port group on a specified forwarding device on an SDN network according to the present disclosure. The following describes the present disclosure from a perspective of a first SDN controller with reference to FIG. 1.

Step 101. The first SDN controller generates the specified identifier according to a device identifier of a first forwarding device in a preset path, a device identifier of a last forwarding device in the preset path, and a device identifier of the specified forwarding device in the preset path.

The specified identifier must meet uniqueness on the entire SDN network to prevent a disorder caused to SDN management by a same port group identifier of different port groups. A device identifier of each forwarding device on the entire SDN is unique, the preset path includes at least two forwarding devices, that is, the first forwarding device and the last forwarding device, and no loopback occurs. Therefore, the first SDN controller generates the specified identifier according to the device identifier of the first forwarding device in the preset path, the device identifier of the last forwarding device in the preset path, and the device identifier of the specified forwarding device in the preset path.

For example, the specified identifier may be formed by combining, according to a predetermined sequence, the device identifier of the first forwarding device in the preset path, the device identifier of the last forwarding device in the preset path, and the device identifier of the specified forwarding device in the preset path, or may be generated, based on a sequential combination of the three device identifiers, by adding other information or performing further processing, or may be generated by combining a part from each of the three device identifiers.

Step 102. The first SDN controller creates, on a second SDN controller (namely, a second control plane device), a specified port group corresponding to the specified identifier, and enables the second SDN controller to deliver the specified port group to the specified forwarding device (namely, a specified forwarding plane device).

After the specified identifier is generated, the first SDN controller may generate a port group creation instruction, and sends the port group creation instruction to the second SDN controller. The port group creation instruction is configured to instruct the second SDN controller to create the specified port group corresponding to the specified identifier and deliver the specified port group to the specified forwarding device.

After receiving the port group creation instruction, the second SDN controller may create a specified port group whose port group identifier is the specified identifier, and deliver the specified port group to the specified forwarding device; or may create a specified port group whose port group identifier is a local identifier, and deliver the specified port group to the specified forwarding device, where the local identifier is a local port group identifier that meets a port group identifier requirement of the second SDN controller, the local identifier is created on the second SDN controller, and the local identifier uniquely corresponds to the specified identifier.

When a topology structure of the SDN changes, the first SDN controller may need to update the preset path created by the first SDN controller. When updating the preset path created by the first SDN controller, the first SDN controller needs to update or delete the specified port group created on the specified forwarding device.

When the specified port group needs to be updated, the first SDN controller may generate a port group update instruction containing the specified identifier, and send the port group update instruction to the second SDN controller. After receiving the port group update instruction, the second SDN controller updates the specified port group corresponding to the specified identifier according to content of the port group update instruction. When the specified port group needs to be deleted, the first SDN controller may generate a port group deletion instruction containing the specified identifier, and send the port group deletion instruction to the second SDN controller. After receiving the port group deletion instruction, the second SDN controller deletes the specified port group corresponding to the specified identifier.

For detailed processes of creating, updating and deleting a specified port group by the second SDN controller, reference may be made to subsequent embodiments, and details are not be described herein.

According to this embodiment, a first SDN controller needs to interact with a second SDN controller only once, to create a port group on a specified forwarding device that is directly controlled by the second SDN controller. A quantity of interactions between the SDN controllers in a port group creation process is small, and the port group creation process is simple.

Figure 2:
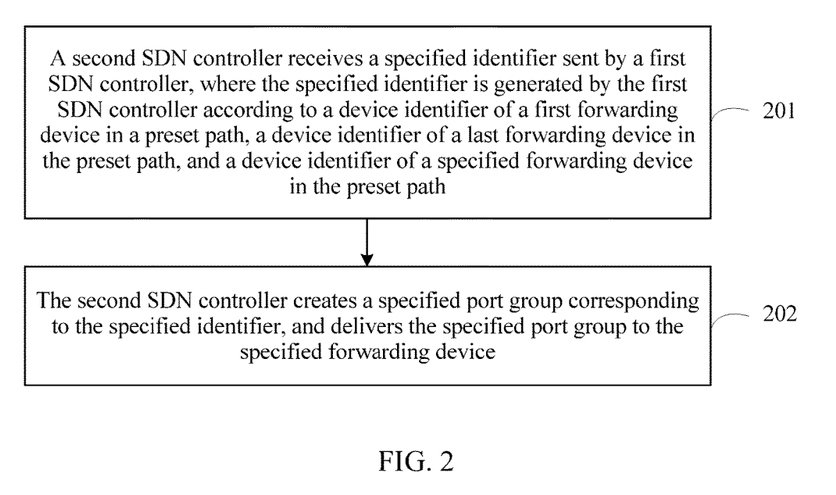
FIG. 2 is a flowchart of another embodiment of a method for creating a port group on a specified forwarding device on an SDN according to the present disclosure.

Referring to FIG. 2, FIG. 2 is a flowchart of another embodiment of a method for creating, by an SDN controller, a port group on a specified forwarding device on an SDN network according to the present disclosure. The following describes the present disclosure from a perspective of a second SDN controller with reference to FIG. 2.

Step 201. The second SDN controller receives a specified identifier sent by a first SDN controller (namely, a first control plane device), where the specified identifier is generated by the first SDN controller according to a device identifier of a first forwarding device in a preset path, a device identifier of a last forwarding device in the preset path, and a device identifier of the specified forwarding device in the preset path.

For a form and a generation method of the specified identifier, reference may be made to the foregoing embodiment, and details are not described herein.

Step 202. The second SDN controller creates a specified port group corresponding to the specified identifier, and delivers the specified port group to the specified forwarding device (namely, a specified forwarding plane device).

After receiving a creation instruction, the second SDN controller may directly create a specified port group whose port group identifier is the specified identifier, and deliver the specified port group whose port group identifier is the specified identifier to the specified forwarding device.

Effective intervals of port group identifiers of different forwarding devices may be greatly different, and therefore the specified identifier does not necessarily meet a port group identifier requirement of the second SDN controller during port group creation. When the specified identifier does not meet the port group identifier requirement of the second SDN controller, the second SDN controller may first convert the specified identifier into a first local identifier that meets an effective interval requirement of a port group identifier of the specified forwarding device, and then create a specified port group whose port group identifier is the first local identifier, and deliver the specified port group whose port group identifier is the first local identifier to the specified forwarding device.

In addition, the second SDN controller may have a strict port group identifier restriction and all available port group identifiers are already determined in a predetermined manner. Therefore, only one of the available port group identifiers can be used as a port group identifier of a specified port group when the specified port group is created. In this case, the second SDN controller may first acquire a second local identifier from the available port group identifiers; establish a correspondence between the second local identifier and the specified identifier; create a specified port group whose port group identifier is the second local identifier; and deliver the specified port group whose port group identifier is the second local identifier to the specified forwarding device.

The second SDN controller may directly control multiple forwarding devices. Therefore, before delivering the specified port group to the specified forwarding device, the second SDN controller may further need to first determine which forwarding device among the forwarding devices that are directly controlled by the second SDN controller is the specified forwarding device. When determining the specified forwarding device, the second SDN controller may acquire the device identifier of the specified forwarding device from the specified identifier, and then determine the specified forwarding device according to the device identifier of the specified forwarding device. For example, when the specified identifier is formed by combining, according to the predetermined sequence, the device identifier of the first forwarding deice in the preset path, the device identifier of the last forwarding device in the preset path, and the device identifier of the specified forwarding device in the preset path, the second SDN controller may first acquire the device identifier of the specified forwarding device from the specified identifier, and then determine the specified forwarding device according to the device identifier of the specified forwarding device.

According to this embodiment, a first SDN controller needs to interact with a second SDN controller only once, to create a port group on a specified forwarding device that is directly controlled by the second SDN controller. A quantity of interactions between the SDN controllers in a port group creation process is small, and the port group creation process is simple.

Figure 3:
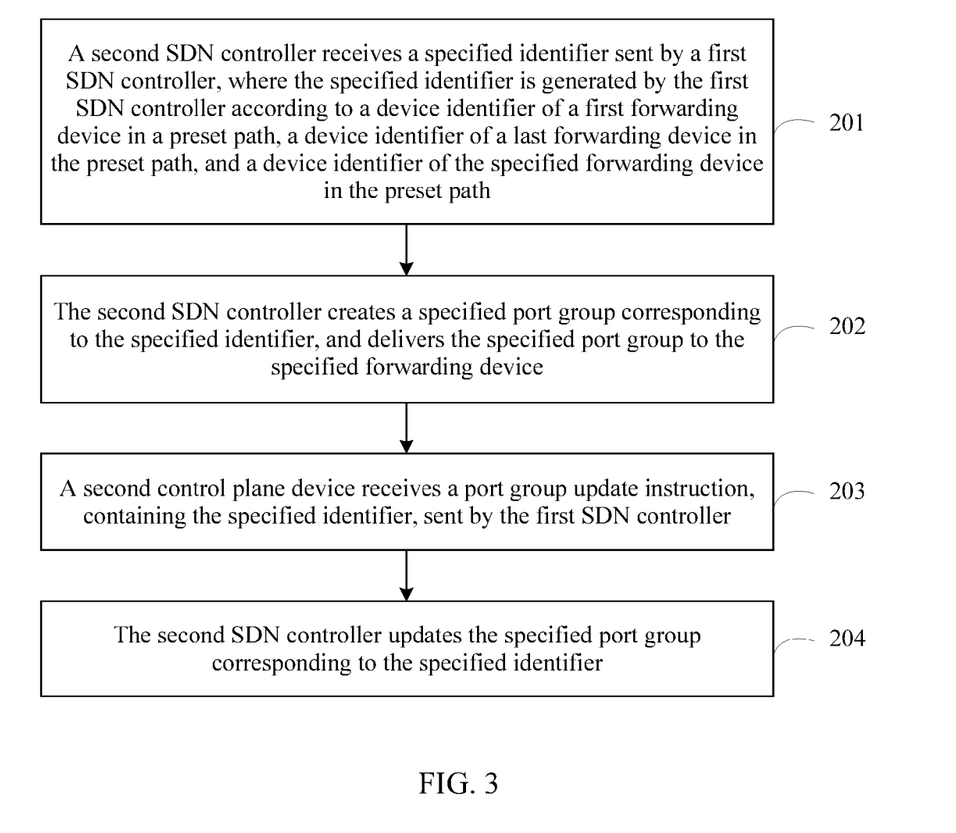
FIG. 3 is a flowchart of another embodiment of a method for creating a port group on a specified forwarding device on an SDN according to the present disclosure.

When updating the preset path created by the first SDN controller, the first SDN controller may further update or delete a port group. Therefore, as shown in FIG. 3, after step 202, the method may further include the following steps.

Step 203. The second SDN controller receives a port group update instruction, containing the specified identifier, sent by the first SDN controller.

When the specified port group needs to be updated, for example, when a port included in the specified port group needs to be adjusted, the first SDN controller may generate a port group update instruction and send the port group update instruction to the second SDN controller, where the port group update instruction contains an identifier of the specified port group.

Step 204. The second SDN controller updates the specified port group corresponding to the specified identifier.

There are generally multiple port groups with different port group identifiers on the second SDN controller. Therefore, after receiving a port group update instruction, the second SDN controller first acquires a specified identifier from the port group update instruction, determines, according to the specified identifier, a specified port group to be updated, and updates the specified port group according to content of the update instruction.

A manner of determining a specified port group by the second SDN controller varies with the port group creation process. The second SDN controller may directly determine a port group whose port group identifier is the specified identifier as the specified port group. Alternatively, the second SDN controller may convert the specified identifier into a first local identifier, and then determine a port group whose port group identifier is the first local identifier as the specified port group. Alternatively, the second SDN may determine a second local identifier corresponding to the specified identifier according to a pre-stored correspondence, and then determine a port group whose port group identifier is the second local identifier as the specified port group.

After determining the specified port group, the second SDN controller updates the specified port group of the second SDN controller according to the content of the port group update instruction, and updates the specified port group on the specified forwarding device. For a process of determining the specified forwarding device, reference may be made to the foregoing embodiment, and details are not described herein.

After an update of the specified port group is completed, the second SDN controller may further return acknowledgment information to the first SDN controller, so as to notify the first SDN controller that the update of the specified port group is completed. Regardless of whether a port group identifier of the specified port group is the specified identifier, the acknowledgment information needs to contain the specified identifier.

Figure 4:
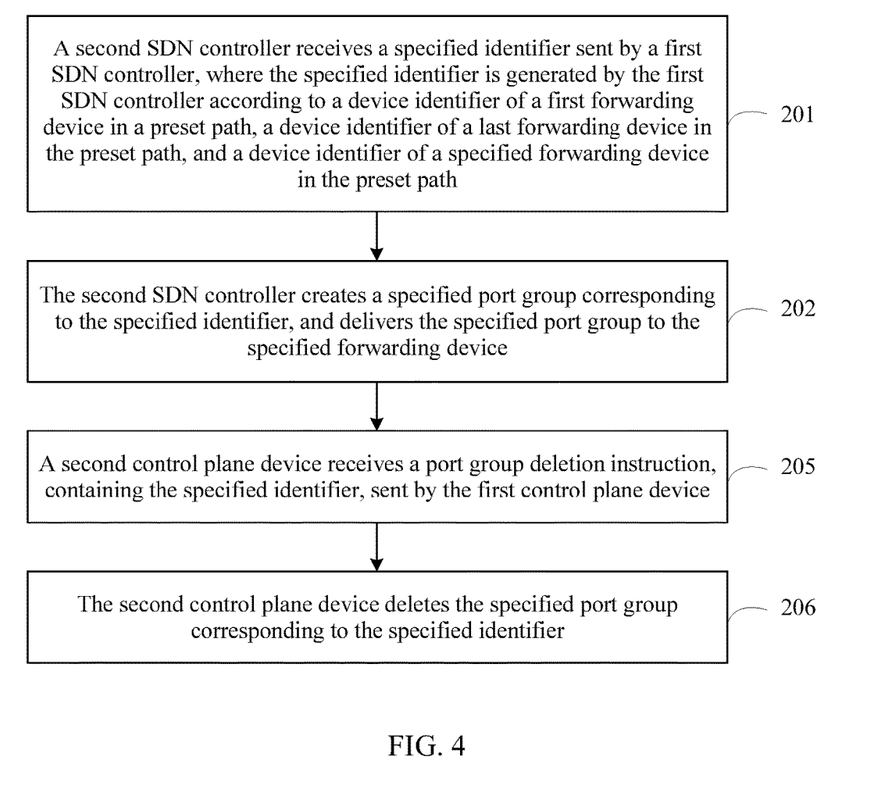
FIG. 4 is a flowchart of another embodiment of a method for creating a port group on a specified forwarding device on an SDN according to the present disclosure.

Therefore, as shown in FIG. 4, after step 202 or step 204, the method may further include the following steps.

Step 205. The second SDN controller receives a port group deletion instruction, containing the specified identifier, sent by the first SDN controller.

When the specified port group needs to be deleted, the first SDN controller may generate a port group deletion instruction and send the port group deletion instruction to the second SDN controller, where the port group deletion instruction contains an identifier of the specified port group.

Step 206. The second SDN controller deletes the specified port group corresponding to the specified identifier.

There are generally multiple port groups with different port group identifiers on the second SDN controller. Therefore, after receiving a port group deletion instruction, the second SDN controller first acquires a specified identifier from the port group deletion instruction, determines, according to the specified identifier, a specified port group to be deleted, and deletes the specified port group.

A manner of determining a specified port group by the second SDN controller varies with the port group creation process. For the manner of determining a specified port group by the second SDN controller, reference may be made to the description above, and details are not described herein.

After determining the specified port group, the second SDN controller deletes the specified port group of the second SDN controller according to the port group update instruction, and deletes the specified port group on the specified forwarding device. For a process of determining the specified forwarding device, reference may be made to the foregoing embodiment, and details are not described herein.

After an update (deletion) of the specified port group is completed, the second SDN controller may further return acknowledgment information to the first SDN controller, so as to notify the first SDN controller that the specified port group is deleted. Regardless of whether a port group identifier of the specified port group is the specified identifier, the acknowledgment information needs to contain the specified identifier.

According to this embodiment, a first SDN controller needs to interact with a second SDN controller only once, so as to update or delete a port group on a specified forwarding device that is directly controlled by the second SDN controller. A quantity of interactions between the SDN controllers is small, and port group update and deletion processes are simple.

Figure 5:
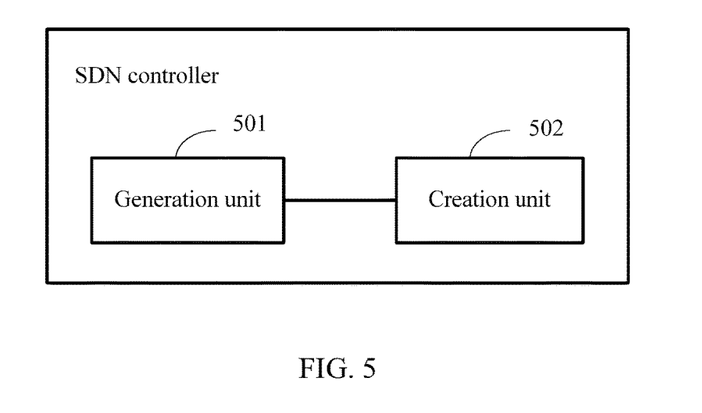
FIG. 5 is a schematic structural diagram of an embodiment of an SDN controller according to the present disclosure.

Referring to FIG. 5, FIG. 5 is a schematic structural diagram of an embodiment of an SDN controller according to the present disclosure. The SDN controller may create a port group on a specified SDN controller. In this embodiment, the specified SDN controller is another SDN controller except the SDN controller in this embodiment.

As shown in FIG. 5, the SDN controller may include a generation unit 501 and a creation unit 502.

The generation unit 501 is configured to generate the specified identifier according to a device identifier of a first forwarding device in a preset path, a device identifier of a last forwarding device in the preset path, and a device identifier of a specified forwarding device in the preset path. The creation unit 502 is configured to create, on a specified SDN controller, a specified port group corresponding to the specified identifier, and enable the specified SDN controller to deliver the specified port group to the specified forwarding device.

Optionally, the generation unit 501 may be configured to generate a specified identifier formed by combining, according to a predetermined sequence, the device identifier of the first forwarding device in the preset path, the device identifier of the last forwarding device in the preset path, and the device identifier of the specified forwarding device in the preset path.

Optionally, the creation unit 502 may be configured to create, on the specified SDN controller, a specified port group whose port group identifier is the specified identifier, and enable the specified SDN controller to deliver the specified port group whose port group identifier is the specified identifier to the specified forwarding device.

Optionally, the creation unit 502 is configured to create, on the specified SDN controller, a specified port group whose port group identifier is a local identifier of the specified SDN controller, and enable the specified SDN controller to deliver the specified port group whose port group identifier is the local identifier of the specified SDN controller to the specified forwarding device, where the local identifier of the specified SDN controller uniquely corresponds to the specified identifier.

According to this embodiment, an SDN controller needs to interact with a specified SDN controller only once, to create a port group on a specified forwarding device that is directly controlled by the specified SDN controller. A quantity of interactions between the SDN controllers in a port group creation process is small, and the port group creation process is simple.

Figure 6:
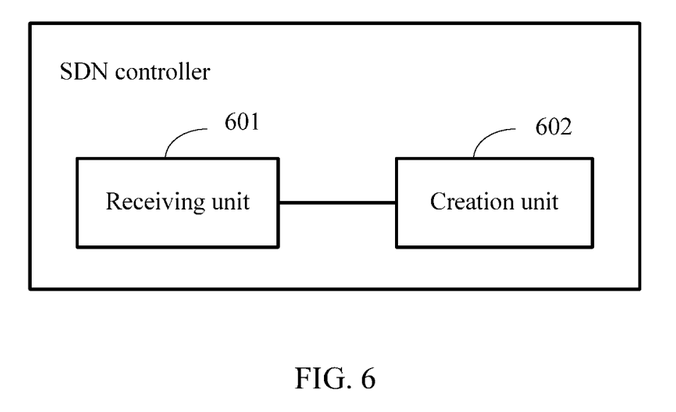
FIG. 6 is a schematic structural diagram of another embodiment of an SDN controller according to the present disclosure.

Referring to FIG. 6, FIG. 6 is a schematic structural diagram of an embodiment of an SDN controller according to the present disclosure. The SDN controller may create a port group on the SDN controller itself according to an instruction of a specified SDN controller. In this embodiment, the specified SDN controller is another SDN controller except the SDN controller in this embodiment.

As shown in FIG. 6, the SDN controller may include a receiving unit 601 and a creation unit 602.

The receiving unit 601 is configured to receive a specified identifier sent by a specified SDN controller, where the specified identifier is generated by the specified SDN controller according to a device identifier of a first forwarding device in a preset path, a device identifier of a last forwarding device in the preset path, and a device identifier of a specified forwarding device in the preset path. The creation unit 602 is configured to create a specified port group corresponding to the specified identifier, and deliver the specified port group to the specified forwarding device.

Optionally, the creation unit 602 may include a first creation subunit configured to create a specified port group whose port group identifier is the specified identifier; and a first delivery subunit configured to deliver the specified port group whose port group identifier is the specified identifier to the specified forwarding device.

Optionally, the creation unit 602 may include a conversion subunit configured to convert the specified identifier into a first local identifier; a second creation subunit configured to create a specified port group whose port group identifier is the first local identifier; and a second delivery subunit configured to deliver the specified port group whose port group identifier is the first local identifier to the specified forwarding device.

Optionally, the creation unit 602 may include an acquiring subunit configured to acquire a second local identifier; an establishment subunit configured to establish a correspondence between the second local identifier and the specified identifier; a third creation subunit configured to create a specified port group whose port group identifier is the second local identifier; and a third delivery subunit configured to deliver the specified port group whose port group identifier is the second local identifier to the specified forwarding device.

Optionally, the SDN controller may further include an acquiring unit configured to acquire the device identifier of the specified forwarding device from the specified identifier; and a determining unit configured to determine the specified forwarding device according to the device identifier of the specified forwarding device.

According to this embodiment, an SDN controller needs to interact with a specified SDN controller only once, to create, according to an instruction of the specified SDN controller, a port group on a specified forwarding device that is directly controlled by the SDN controller itself. A quantity of interactions between the SDN controllers in a port group creation process is small, and the port group creation process is simple.

Figure 7:
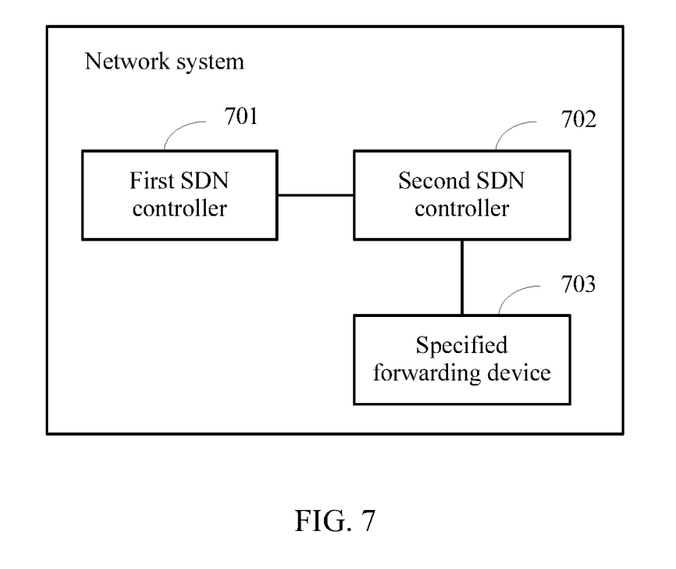
FIG. 7 is a schematic structural diagram of a network system according to the present disclosure.

Referring to FIG. 7, FIG. 7 is a schematic structural diagram of a network system according to the present disclosure. The network system includes a first SDN controller 701, a second SDN controller 702, and a specified forwarding device 703, and the specified forwarding device 703 is directly controlled by the second SDN controller 702.

The first SDN controller 701 is configured to generate the specified identifier according to a device identifier of a first forwarding device in a preset path, a device identifier of a last forwarding device in the preset path, and a device identifier of the specified forwarding device 703 in the preset path; and create, on the second SDN controller 702, a specified port group corresponding to the specified identifier, and enable the second SDN controller 702 to deliver the specified port group to the specified forwarding device 703. The second SDN controller 702 is configured to receive the specified identifier sent by the first SDN controller 701; create the specified port group corresponding to the specified identifier; and deliver the specified port group to the specified forwarding device 703.

Optionally, the second SDN controller 702 may be configured to create a specified port group whose port group identifier is the specified identifier, and deliver the specified port group whose port group identifier is the specified identifier to the specified forwarding device 703.

Optionally, the second SDN controller 702 may be configured to convert the specified identifier into a first local identifier; create a specified port group whose port group identifier is the first local identifier; and deliver the specified port group whose port group identifier is the first local identifier to the specified forwarding device 703.

Optionally, the second SDN controller 702 may be configured to acquire a second local identifier; establish a correspondence between the second local identifier and the specified identifier; create a specified port group whose port group identifier is the second local identifier; and deliver the specified port group whose port group identifier is the second local identifier to the specified forwarding device 703.

According to this embodiment, a first SDN controller 701 needs to interact with a second SDN controller 702 only once, to create a port group on a specified forwarding device 703 that is directly controlled by the second SDN controller 702. A quantity of interactions between the SDN controllers in a port group creation process is small, and the port group creation process is simple.

Figure 8:
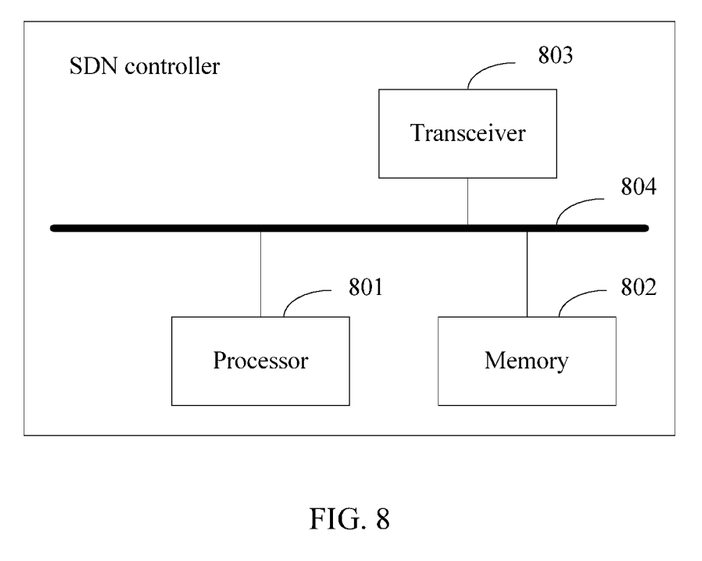
FIG. 8 is a schematic structural diagram of another embodiment of an SDN controller according to the present disclosure.

Referring to FIG. 8, FIG. 8 is a schematic structural diagram of another embodiment of an SDN controller according to the present disclosure. In this embodiment, a specified SDN controller is another SDN controller except the SDN controller in this embodiment.

As shown in FIG. 8, the SDN controller may include a processor 801, a memory 802, and a transceiver 803. The processor 801, the memory 802, and the transceiver 803 are interconnected. For example, the processor 801, the memory 802, and the transceiver 803 may be interconnected using a bus 804.

The memory 802 is configured to store a computer execution instruction. A program may include program code, and the program code includes a computer execution instruction. The memory 802 may include a random access memory (RAM), and may also include a non-volatile memory, for example, at least one disk memory.

The processor 801 is configured to generate the specified identifier according to a device identifier of a first forwarding device in a preset path, a device identifier of a last forwarding device in the preset path, and a device identifier of a specified forwarding device in the preset path; and create, using the transceiver 803 and on a specified SDN controller, a specified port group corresponding to the specified identifier, and enable the specified SDN controller to deliver the specified port group to the specified forwarding device.

The processor 801 may further be configured to generate a specified identifier formed by combining, according to a predetermined sequence, the device identifier of the first forwarding device in the preset path, the device identifier of the last forwarding device in the preset path, and the device identifier of the specified forwarding device in the preset path.

The processor 801 may further be configured to create, on the specified SDN controller, a specified port group whose port group identifier is the specified identifier, and enable the specified SDN controller to deliver the specified port group whose port group identifier is the specified identifier to the specified forwarding device.

The processor 801 may further be configured to create, on the specified SDN controller, a specified port group whose port group identifier is a local identifier of the specified SDN controller, and enable the specified SDN controller to deliver the specified port group whose port group identifier is the local identifier of the specified SDN controller to the specified forwarding device, where the local identifier of the specified SDN controller uniquely corresponds to the specified identifier.

According to this embodiment, an SDN controller needs to interact with another SDN controller only once, to create a port group on a specified forwarding device that is directly controlled by the another SDN controller. A quantity of interactions between the SDN controllers in a port group creation process is small, and the port group creation process is simple.

Figure 9:
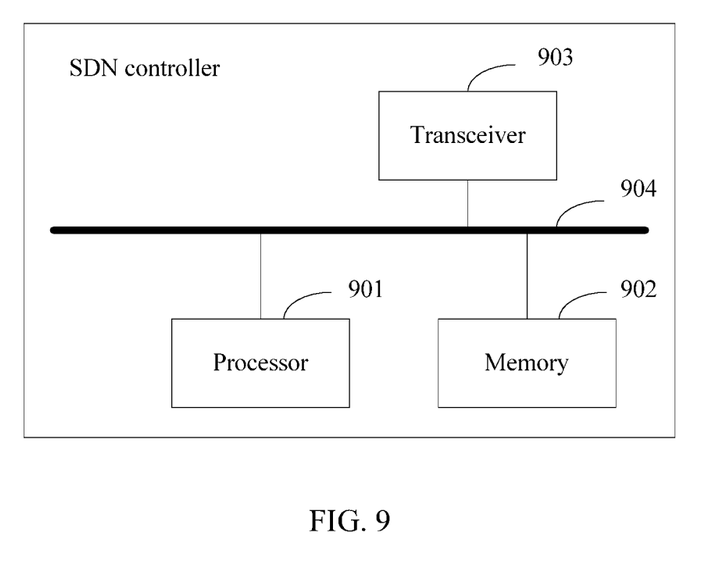
FIG. 9 is a schematic structural diagram of another embodiment of an SDN controller according to the present disclosure.

Referring to FIG. 9, FIG. 9 is a schematic structural diagram of another embodiment of an SDN controller according to the present disclosure. In this embodiment, a specified SDN controller is another SDN controller except the SDN controller in this embodiment.

As shown in FIG. 9, the SDN controller may include a processor 901, a memory 902 and a transceiver 903. The processor 901, the memory 902 and the transceiver 903 are interconnected. For example, the processor 901, the memory 902, and the transceiver 903 may be connected using a bus 904.

The memory 902 is configured to store a computer execution instruction. A program may include program code, and the program code includes a computer execution instruction. The memory 902 may include a RAM, and may also include a non-volatile memory, for example, at least one disk memory.

The transceiver 903 is configured to receive a specified identifier sent by a specified SDN controller, where the specified identifier is generated by the specified SDN controller according to a device identifier of a first forwarding device in a preset path, a device identifier of a last forwarding device in the preset path, and a device identifier of a specified forwarding device in the preset path.

The processor 901 is configured to create a specified port group corresponding to the specified identifier, and deliver the specified port group to the specified forwarding device using the transceiver 903.

The processor 901 may further be create a specified port group whose port group identifier is the specified identifier, and deliver the specified port group whose port group identifier is the specified identifier to the specified forwarding device using the transceiver 903.

The processor 901 may further be configured to convert the specified identifier into a first local identifier; create a specified port group whose port group identifier is the first local identifier; and deliver the specified port group whose port group identifier is the first local identifier to the specified forwarding device using the transceiver 903.

The processor 901 may further be configured to acquire a second local identifier; establish a correspondence between the second local identifier and the specified identifier; create a specified port group whose port group identifier is the second local identifier; and deliver the specified port group whose port group identifier is the second local identifier to the specified forwarding device using the transceiver 903.

The processor 901 may further be configured to acquire the device identifier of the specified forwarding device from the specified identifier; and determine the specified forwarding device according to the device identifier of the specified forwarding device.

According to this embodiment, an SDN controller needs to interact with another SDN controller only once, to create a port group on a specified forwarding device that is directly controlled by the SDN controller itself. A quantity of interactions between the SDN controllers in a port group creation process is small, and the port group creation process is simple.

A person skilled in the art may clearly understand that, the technologies in the embodiments of the present disclosure may be implemented by software in addition to a necessary general hardware platform. Based on such an understanding, the technical solutions in the embodiments of the present disclosure essentially, or the part contributing to the prior art may be implemented in the form of a software product. The software product is stored in a memory medium, such as a read-only memory (ROM)/RAM, a magnetic disk, or an optical disc, and includes several instructions for instructing a computer device (which may be a personal computer, a server, or a network device) to perform the methods described in the embodiments or some parts of the embodiments of the present disclosure.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A method for creating a port group on a specified forwarding device on a software defined network (SDN), wherein the method comprises:
   generating, by a first SDN controller, a specified identifier according to a device identifier of a first forwarding device in a preset path, a device identifier of a last forwarding device in the preset path, and a device identifier of the specified forwarding device in the preset path, the first SDN controller generating the specified identifier by combining, according to a predetermined sequence, the device identifier of the first forwarding device in the preset path, the device identifier of the last forwarding device in the preset path, and the device identifier of the specified forwarding device in the preset path;
   creating, by the first SDN controller on a second SDN controller, a specified port group corresponding to the specified identifier; and
   enabling the second SDN controller to deliver the specified port group to the specified forwarding device.

2. The method of claim 1, wherein creating, by the first SDN controller on the second SDN controller, the specified port group corresponding to the specified identifier, and enabling the second SDN controller to deliver the specified port group to the specified forwarding device comprises:
   creating, by the first SDN controller on the second SDN controller, a specified port group whose port group identifier is the specified identifier; and
   enabling the second SDN controller to deliver the specified port group whose port group identifier is the specified identifier to the specified forwarding device.

3. The method of claim 1, wherein creating, by the first SDN controller on the second SDN controller, the specified port group corresponding to the specified identifier, and enabling the second SDN controller to deliver the specified port group to the specified forwarding device comprises:
   creating, by the first SDN controller on the second SDN controller, a specified port group whose port group identifier is a local identifier of the second SDN controller; and
   enabling the second SDN controller to deliver the specified port group whose port group identifier is the local identifier of the second SDN controller to the specified forwarding device,
   wherein the local identifier of the second SDN controller uniquely corresponds to the specified identifier.

4. A method for creating a port group on a specified forwarding device on a software defined network (SDN), wherein the method comprises:
   receiving, by a second SDN controller, a specified identifier sent by a first SDN controller, wherein the specified identifier is generated by the first SDN controller according to a device identifier of a first forwarding device in a preset path, a device identifier of a last forwarding device in the preset path, and a device identifier of the specified forwarding device in the preset path;
   creating, by the second SDN controller, a specified port group corresponding to the specified identifier; and
   delivering the specified port group to the specified forwarding device, and
   wherein creating, by the second SDN controller, the specified port group corresponding to the specified identifier, and delivering the specified port group to the specified forwarding device comprises:
   converting, by the second SDN controller, the specified identifier into a first local identifier;
   creating, by the second SDN controller, a specified port group whose port group identifier is the first local identifier; and
   delivering, by the second SDN controller, the specified port group whose port group identifier is the first local identifier to the specified forwarding device.

5. The method of claim 4, wherein before delivering, by the second SDN controller, the specified port group to the specified forwarding device, the method further comprises:
   acquiring, by the second SDN controller, the device identifier of the specified forwarding device from the specified identifier; and
   determining, by the second SDN controller, the specified forwarding device according to the device identifier of the specified forwarding device.

6. A software defined network (SDN) controller, comprising:
   a memory comprising instructions; and
   a processor coupled to the memory, wherein the instructions cause the processor to be configured to:

generate a specified identifier according to a device identifier of a first forwarding device in a preset path, a device identifier of a last forwarding device in the preset path, and a device identifier of a specified forwarding device in the preset path, wherein the specified identifier is generated by combining, according to a predetermined sequence, the device identifier of the first forwarding device in the preset path, the device identifier of the last forwarding device in the preset path, and the device identifier of the specified forwarding device in the preset path;

create, on a specified SDN controller, a specified port group corresponding to the specified identifier; and enable the specified SDN controller to deliver the specified port group to the specified forwarding device.

7. The SDN controller of claim 6, wherein the instructions further cause the processor to be configured to:

create, on the specified SDN controller, a specified port group whose port group identifier is the specified identifier; and enable the specified SDN controller to deliver the specified port group whose port group identifier is the specified identifier to the specified forwarding device.

8. The SDN controller of claim 6, wherein the instructions further cause the processor to be configured to:

create, on the specified SDN controller, a specified port group whose port group identifier is a local identifier of the specified SDN controller; and enable the specified SDN controller to deliver the specified port group whose port group identifier is the local identifier of the specified SDN controller to the specified forwarding device, wherein the local identifier of the specified SDN controller uniquely corresponds to the specified identifier.

9. A software defined network (SDN) controller, comprising:

a memory comprising instructions; and a processor coupled to the memory, wherein the instructions cause the processor to be configured to:

receive a specified identifier sent by a specified SDN controller, wherein the specified identifier is generated by the specified SDN controller according to a device identifier of a first forwarding device in a preset path, a device identifier of a last forwarding device in the preset path, and a device identifier of a specified forwarding device in the preset path;

create a specified port group corresponding to the specified identifier;

deliver the specified port group to the specified forwarding device;

convert the specified identifier into a first local identifier;

create a specified port group whose port group identifier is the first local identifier; and deliver the specified port group whose port group identifier is the first local identifier to the specified forwarding device.

10. The SDN controller of claim 9, wherein the instructions further cause the processor to be configured to:

create a specified port group whose port group identifier is the specified identifier; and deliver the specified port group whose port group identifier is the specified identifier to the specified forwarding device.

11. The SDN controller of claim 9, wherein the instructions further cause the processor to be configured to:

acquire the device identifier of the specified forwarding device from the specified identifier; and determine the specified forwarding device according to the device identifier of the specified forwarding device.

12. A network system, comprising:

a first software defined network (SDN) controller;

a second SDN controller; and a specified forwarding device, wherein the specified forwarding device is directly controlled by the second SDN controller, wherein the first SDN controller is configured to:

generate a specified identifier according to a device identifier of a first forwarding device in a preset path, a device identifier of a last forwarding device in the preset path, and a device identifier of the specified forwarding device in the preset path, the specified identifier being generated by combining, according to a predetermined sequence, the device identifier of the first forwarding device in the preset path, the device identifier of the last forwarding device in the preset path, and the device identifier of the specified forwarding device in the preset path;

create, on the second SDN controller, a specified port group corresponding to the specified identifier; and enable the second SDN controller to deliver the specified port group to the specified forwarding device, and wherein the second SDN controller is configured to:

receive the specified identifier sent by the first SDN controller;

create the specified port group corresponding to the specified identifier; and deliver the specified port group to the specified forwarding device.

13. The network system of claim 12, wherein the second SDN controller is configured to:

create a specified port group whose port group identifier is the specified identifier; and deliver the specified port group whose port group identifier is the specified identifier to the specified forwarding device.

* * * * *